UNITED STATES PATENT OFFICE 2,619,504

PROCESS OF MAKING 4(5)-p-MENTHEN-3-ONE

Carlisle H. Bibb and Henry E. McLaughlin, Pensacola, Fla., assignors to Newport Industries, Inc., Pensacola, Fla., a corporation of Delaware No Drawing. Application September 15, 1950, Serial No. 185,144

5 Claims. (Cl. 260—587)

The present invention relates to a method of preparing 3-menthenone from Δ-3 p-menthene.

The ordinary process for preparing 4(5)-p-menthen-3-one from Δ-3 p-menthene involves the treatment of Δ-3 p-menthene with nitrosyl chloride followed by a reaction with alkali to produce the ketoxime. This reaction product must then be treated to isolate the ketoxime. After isolation, the ketoxime is converted to the ketone by reacting the ketoxime with an acid. In the conversion from the ketoxime to the ketone, considerable tar formation occurs, making the reaction difficult to carry out and the reaction product difficult to isolate. Large quantities of alkali and acid are ordinarily used in such syntheses so that, all factors considered, the production of 4(5)-p-menthen-3-one from Δ-3 p-menthene is a relatively expensive process.

We have now found that 4(5)-p-menthen-3-one can be synthesized from Δ-3 p-menthene in fewer steps than used in the previously used processes.

The isomer of the compound 4(5)-p-menthen-3-one which predominates in the reaction product produced according to the present invention has the formula:

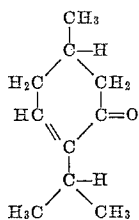

It is a colorless liquid having a boiling point of about 208° C., is insoluble in water but soluble in alcohol.

The compound Δ-3 p-menthene has the formula:

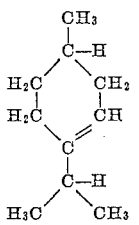

It is a colorless liquid having a boiling point of 163° C. and is soluble in alcohol.

An object of the present invention, therefore, is to provide a simple and practical method for converting Δ-3 p-menthene into 4(5)-p-menthen-3-one.

Another object of the present invention is to provide a method for preparing 4(5)-p-menthen-3-one from Δ-3 p-menthene without the use of alkali and acids.

Still another object of the present invention is to provide a method for preparing 4(5)-p-menthen-3-one from Δ-3 p-menthene in relatively high yields.

We have now found that 4(5)-p-menthen-3-one can be prepared from Δ-3 p-menthene in substantial yields by reacting the Δ-3 p-menthene with nitrosyl chloride to produce a nitrosochloride of the menthene, and that this derivative can be readily converted to the ketone and recovered from the reaction mass with very little tar formation by the simple expedient of steam distillation, or agitation with hot water and subsequent separation of the oily layer from the water. Where water, at an elevated temperature, rather than steam, is used, the temperature should be sufficiently high to bring about the conversion of Δ-3 p-menthene to 4(5)-p-menthen-3-one within a reasonable time. Thus, while the reaction would proceed, although very slowly, at room temperature (about 25° C.), it is preferable to conduct the reaction at temperatures near the boiling point of water. By carrying the reaction out in a pressure vessel, temperatures above 100° C. can be used with a saving in time but at some sacrifice in the simplicity of apparatus and operation.

We have carried out the above-described reaction in three different manners, and it will be appreciated that other manners will suggest themselves to those skilled in the art.

For example, in one method of preparation, Δ-3 p-menthene was cooled to a temperature of about 0° C. and reacted with a slowly added stream of gaseous nitrosyl chloride (NOCl) until a thickened mass of the crystalline nitrosochloride derivative was formed. The mass was then allowed to attain room temperature and was added to an equal quantity of water, or a sufficient amount to disperse the oily mixture, in a steam still. After raising the temperature of the mass to the boiling point, steam was passed through the mixture. The overhead fraction was then condensed and collected in a receiver.

The oil distilling first was largely unreacted Δ-3 p-menthene, followed by the 4(5)-menthen-3-one. The total oily distillate was separated from the condensate water and separated by fractional distillation into relatively pure Δ-3 p-menthene, which may be used to react with additional quantities of nitrosyl chloride, and relatively pure 4(5)-p-menthen-3-one.

In a second method of operation, the mass containing the nitrosochloride of Δ-3 p-menthene, prepared as explained previously, was filtered from the unreacted menthene. Sufficient water was added to the remaining solid crystals to disperse the crystals, whereupon the mixture was heated to boiling and distilled with sufficient quantities of steam. The oil of the distillate recovered was substantially all 4(5)-p-menthen-3-one.

In a third method of operation, the mass of crystalline nitrosochloride of Δ-3 p-menthene, prepared as previously explained in the second method, was agitated with about equal quantities of hot water, the amount of water not being critical. The temperature was kept somewhat under the normal boiling point of the mixture, and agitation continued for seven hours. The mixture was then allowed to settle, and the water layer drawn off and the oil recovered. The oil was comprised substantially wholly of 4(5)-p-menthen-3-one.

Although several reactions occur simultaneously in this process the main reaction may be expressed by the following equation:

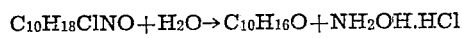
$$C_{10}H_{18}ClNO + H_2O \rightarrow C_{10}H_{16}O + NH_2OH \cdot HCl$$

since the principal compounds found in the reaction product are 4(5)-p-menthen-3-one and hydroxylamine hydrochloride.

The yields we have obtained by the aforementioned processes are quite high, being approximately 70% of the theoretical yield based on the nitrosyl chloride, as compared to around 40% by previously known methods.

From the foregoing it will be apparent that we have herein provided a simplified synthesis for 4(5)-p-menthen-3-one from Δ-3 p-menthene. The reaction proceeds with very little tar formation compared with large amounts common in the previously used syntheses of this nature.

The term "water at an elevated temperature," as used in the claims is intended to include water in liquid phase as well as in gaseous phase, that is, as steam.

It will be evident that modifications and variations may be effected without departing from the scope of the novel concepts of the present invention.

We claim as our invention:

1. The method of making 4(5)-p-menthen-3-one which comprises treating the nitrosochloride of Δ-3 p-menthene with water at an elevated temperature to produce 4(5)-p-menthen-3-one and hydroxylamine hydrochloride, and separating the 4(5)-p-menthen-3-one from the reaction product.

2. The method of making 4(5)-p-menthen-3-one which comprises reacting Δ-3 p-menthene with nitrosyl chloride, and steam-distilling the reaction product to recover 4(5)-p-menthen-3-one.

3. The method of making 4(5)-p-menthen-3-one which comprises reacting Δ-3 p-menthene with nitrosyl chloride, adding water to the resulting product, steam-distilling the resulting mixture, condensing the overhead fraction comprising unreacted Δ-3 p-menthene and 4(5)-p-menthen-3-one, and separating 4(5)-p-menthen-3-one from said fraction.

4. The method of making 4(5)-p-menthen-3-one from Δ-3 p-menthene which comprises reacting Δ-3 p-menthene with nitrosyl chloride, filtering the resulting reaction product to recover unreacted Δ-3 p-menthene, and steam-distilling the filtered product to recover 4(5)-p-menthen-3-one.

5. The method of synthesizing 4(5)-p-menthen-3-one from Δ-3 p-menthene which comprises reacting Δ-3 p-menthene with nitrosyl chloride, treating the reaction product with hot water, and recovering the 4(5)-p-menthen-3-one therefrom.

CARLISLE H. BIBB.
HENRY E. McLAUGHLIN.

REFERENCES CITED

The following references are of record in the file of this patent:

UNITED STATES PATENTS

| Number | Name | Date |
| --- | --- | --- |
| 2,435,570 | Beckham | Feb. 10, 1948 |

OTHER REFERENCES

Tilden et al., J. Chem. Soc., vol. 65, pp. 324–35 (1894).

Wallach, Annalen, vol. 381, pp. 51–60 (1911).

Borgwardt et al., J. Am. Chem. Soc., vol. 56, pp. 1185–87 (1934).

Cohen et al., J. Chem. Soc., 1935 volume, pp. 1570–72.